Figure 1:
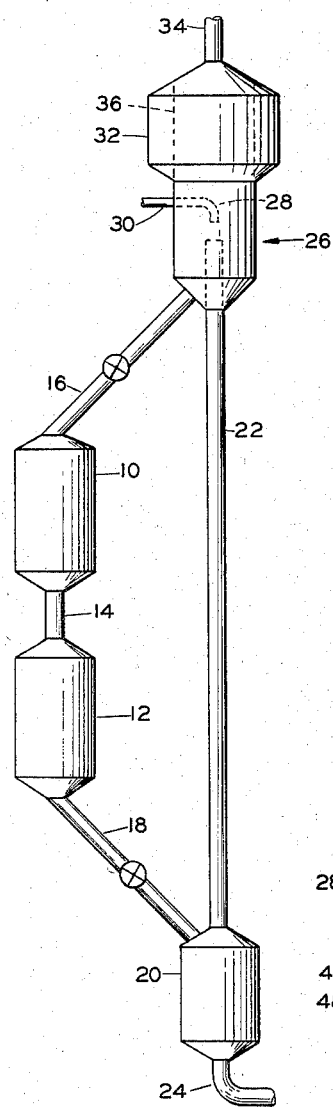

Feb. 24, 1959

K. A. HARPER 2,875,000

PROCESS AND APPARATUS FOR DISENGAGING
PARTICULATE SOLID CONTACT MATERIAL

Filed Jan. 24, 1955

INVENTOR.
K. A. HARPER

BY *Hudson H. Young*

ATTORNEY

United States Patent Office

2,875,000
Patented Feb. 24, 1959

2,875,000

PROCESS AND APPARATUS FOR DISENGAGING PARTICULATE SOLID CONTACT MATERIAL

Kenneth A. Harper, Bartlesville, Okla., assignor to Phillips Petroleum Company, a corporation of Delaware Application January 24, 1955, Serial No. 483,513

8 Claims. (Cl. 302—59)

This invention relates to a process and apparatus for lifting or elevating particulate solid material. A specific aspect of the invention pertains to a process and apparatus for decreasing the vertical velocity of particulate solids in a gas lift process at the upper end of the lift in the disengaging chamber.

The circulation of solid contact materials such as adsorbents, catalysts, and heat-exchange materials is conventional in a great many types of processes. Such circulation of particulate solids frequently requires substantially vertical elevation of the material to an elevated contacting vessel or chamber of the plant. One of the methods in general use involves a pneumatic lift wherein the particulate solids are introduced to a high-velocity lifting gas at the bottom of a lift tube and the ascending gas delivers the material to the upper end of the tube which is usually positioned above the level at which the solids are to be used. The solid material is disengaged from the lift tube in a collection or disengaging chamber surrounding the upper end of the tube and from there the material gravitates thru a suitable conduit to the vessel in which the same is to be used. Catalyst material in granular form is frequently conveyed in this manner to an upper chamber of a catalyst conversion system where the material is contacted with either an oxidizing gas to burn off material from the catalyst, or with reactant fluids under reaction conditions. In either event, the material is usually transferred through a suitable conduit by gravity from the upper chamber to a lower contacting chamber where the other phase of the process is performed. In such operation the catalyst is then passed, usually by gravity, to the lower end of the lift tube for elevation to the disengaging chamber to repeat the cycle.

In pebble heater processes which are used frequently in hydrocarbon conversion and other chemical processes, as well as for superheating gases, pebbles are passed thru a cycle similar to that used in moving bed catalyst operation as described above. Pebbles are usually compacted from ceramic materials, such as alumina, and are generally spherical in form and of sizes up to about 1 inch in diameter. Most pebbles are subject to attrition and breakage in the heat-exchange chambers and in the transfer conduits.

One of the problems involved in the elevation of particulate solids in such processes is the loss of material by attrition and breakage necessitating the removal of the broken and/or powdered material from the system in which the contact material is being utilized. A great deal of the attrition and breakage involved in gas elevation of contact material takes place in the disengaging chamber surrounding the upper end of the lift tube. It is difficult to control the velocity of the ascending particulate solids as they pass out of the upper end of the lift tube and therefore, impingement of the solid particles on the dome of the disengaging chamber and collision of the ascending particles with particles falling from the upper portion of the disengaging chamber are inherent in conventional operation and are also responsible for the major portion of the breakage and attrition resulting from gas lift elevation. One of the common expedients utilized in the prior art to stop the ascent of the particulate material in the disengaging chamber is to position one or more baffles of various types in the disengaging chamber so that these baffles stop or otherwise control the ascent and flow of solid particles in this chamber. Another conventional process utilizes a horizontal blast of gas across the open end of the lift tube so as to impart to the ascending particles a lateral force which deflects the same toward the wall of the disengaging chamber at a level substantially above the upper end of the lift tube and the granular material is then trapped on a baffle extending out from the side of the disengaging chamber. The difficulty in this type of process lies in the fact that collision of the contact material with the baffles and with the walls of the disengaging vessel are not avoided or materially lessened.

The instant invention provides a novel process and apparatus whereby the disadvantages of prior art operation are avoided or substantially diminished. It has been found that the vertical velocity of particulate solid material ascending from the upper end of a gas lift tube can be substantially reduced so as to prevent impact of the granular material on the roof of the disengaging vessel by directing a stream of gas downwardly toward the upper end of the lift tube in sufficient volume and at a sufficient rate to decrease the vertical velocity of the ascending material substantially to zero and cause the particles to move laterally and downwardly to the bottom of the disengaging chamber or to the bed of material in the lower section thereof.

Figure 2:
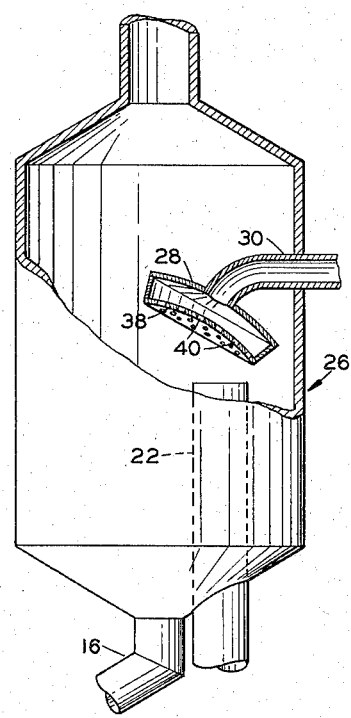
Figure 3:
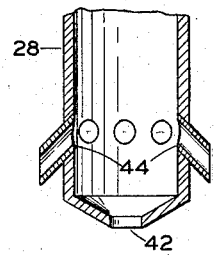
Figure 4:
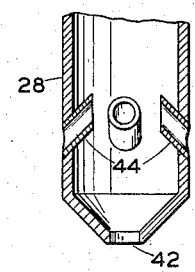
Figure 5:
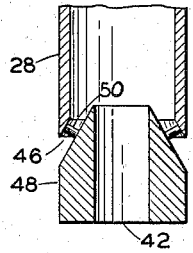
Figure 6:
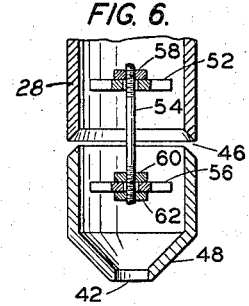
Figure 7:
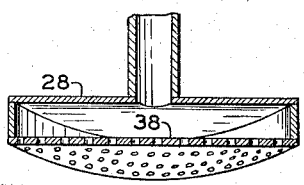

A more complete understanding of the invention may be obtained from a consideration of the accompanying drawing of which Figure 1 is an elevation of contacting apparatus utilizing a lift tube and the catalyst or pebble disengaging means of the invention; Figure 2 is a cross-sectional view of one embodiment of the pneumatic deflector arrangement of the invention; Figure 3 is a longitudinal cross sectional view of a modification of the gas deflector; Figures 4, 5, and 6 are similar longitudinal cross sectional views of other embodiments of the gas deflector; and Figure 7 is a cross-sectional view of another gas injection head or deflector suitable for use in the invention.

Referring to Figure 1, a pair of contacting vessels 10 and 12 are connected by a conduit or throat 14 and arranged for gravitational flow of contact material therethrough. A solids delivery tube 16 leads into the upper end of vessel 10, and a delivery tube 18 connects the lower section of vessel 12 with elevator boot 20 positioned on the lower end of gas lift tube 22. A conduit 24 supplies lift gas for operation of the lift in conventional manner. Lift tube 22 extends to a level well above upper chamber 10 and into a solids disengaging chamber 26 a substantial distance. Conduit 16 connects with the bottom of disengaging chamber 26 to provide for flow of solids from this chamber to vessel 10. A gas injection or deflector tube or nozzle 28 is positioned above and spaced apart from the upper end of lift tube 22 and is directed toward the same. Gas is supplied through deflector 28 through a gas supply line 30.

The upper section 32 of disengaging vessel 26 is preferably of larger diameter than the lower section thereof. This expanded form of the upper section of vessel 26 assists in reducing the amount of finely divided contact material passing out of the vessel through effluent line 34 suspended in the mixture of lift gas and deflecting gas. In some applications of the process and apparatus it may be desirable to remove the fines from the system in the mixture of lift gas and deflecting gas passing through effluent line 34. In this instance it may be desirable to provide a vessel 26 which is of uniform cross section as shown at 36. It is also feasible to construct vessel 26 so that the upper section 32 is flared outwardly at the top in the form of an inverted truncated cone or even in the form of an inverted bell.

Figure 2 shows an embodiment of the invention in which lift tube 22 is eccentric with respect to disengaging chamber 26 and solids deflector 28 comprises a deflecting head having a perforate plate 38 in the head facing the end of the lift tube. The orifices 40 in plate 38 are directed so that those nearest the end of the lift tube and in the lowermost section direct deflecting gas obliquely across the end of the lift tube and those at the uppermost section of plate 38 direct the gas substantially vertically so that a substantial portion of the deflecting gas applied to the solid material egressing from the end of the lift tube applies a downward force to the material after it has passed laterally beyond the extension of the lift tube. This arrangement facilitates the control of the disengaging step and delivers the bulk of the disengaged material to the lower section of disengaging vessel 26 opposite lift tube 20 with greatly decreased contacting of solids with the collector wall.

Figures 3 and 4 show a gas deflector 28 which has an axial opening 42 in its delivery end. A plurality of obliquely directed nozzles 44 in the wall of the gas deflector are provided in order to direct gas jets toward the solid contact material after the same has moved laterally out of alignment with the lift tube thereby facilitating the complete stoppage of upward movement of the particulate material and causing the same to fall to the lower section of vessel 26 substantially without collision with the wall of the vessel. Nozzles 44 are extended outwardly from the body of the deflector in Figure 3 and are inwardly extended in Figure 4. These nozzles may be screwed into the body of the deflector or may be welded in position at a suitable oblique angle to the axis of the deflector body.

Figure 5 shows an embodiment of the gas deflector having an axial opening 42 and an annulus 46 extending entirely around the body of the deflector for oblique injection of gas. Deflector nose 48 is attached to the body of the deflector by two or more pins 50 or by a similar spider device. The direction of oblique gas injection is controlled in this deflector by the angle of the walls of annulus 46 which is preferably at least 45° with the horizontal in order to apply retarding force on the solids in a direction suitable for reducing their vertical velocity to zero and minimizing impingement of the solids on the walls of the disengager.

Figure 6 shows an embodiment of the gas deflector which utilizes a spider construction 52 within conduit 28 to support nose section or element 48 by means of a bolt spacer 54 and a second spider construction 56 attached directly to nose element 48. This arrangement avoids any obstruction in annular gas passageway 46. A nut 58 and a shoulder on the upper end of bolt 54 fix same rigidly to spider 52 and a pair of nuts 60 and 62 on the opposite end of bolt 54 serve to fasten spider 56 to bolt 54 and render annular space 46 adjustable.

Figure 7 shows another embodiment of the deflector utilizable in the apparatus of the invention. This deflector is similar to that shown in Figure 2, the principal difference being in the shape of plate 38 which is arcuate or outwardly concave in Figure 2 and plane in Figure 7. The deflector of Figure 7 is preferably of greater lateral dimensions than the diameter of the upper end of the lift tube so that the same extends a substantial distance beyond the extension of the lift tube thereby facilitating controlled disengagement of the elevated particulate material without causing substantial impact of the particles with the walls of the disengaging vessel.

The mass of deflecting gas and its rate of flow can readily be adjusted by one skilled in the art so as to properly control the disengaging of a solids stream from a lift gas stream of any given characteristics. The control is based on the well-known physical principle that $MV^2$ is a measure of the energy required to decelerate the motion matter to zero. In the instance at hand the retarding force of gravity and the diminishing effect of laterally expanding lift gas are factors to be considered. The mass and velocity of the solids as they enter the disengaging chamber from the end of the lift and the mass and velocity of the lift gas must be offset or neutralized by the mass and velocity of the deflecting or "damping" gas. When a pneumatic lift is properly controlled, the velocity of the solids and lift gas at the upper end of the lift are within limits which render disengagement of the solids with a stream of deflecting gas readily feasible so as to appreciably decrease collision of solids with the walls of the disengaging vessel.

Generally the method of the invention requires less deflecting gas than the volume of lift gas and preferably not more than 5 to 10 weight percent of the lift gas, the higher velocity of the deflecting or "damping" gas offsetting the larger mass of lift gas.

The deflector or "damping" gas injector must be spaced apart from the upper end of the lift tube a substantial distance and preferably a distance approximating the diameter of the upper end thereof, although this distance may vary from about 25% less to about twice this diameter and be within the limits of operability. In one embodiment using a lift tube with a 34" diameter upper end, a space of 36" between the lift tube and the deflector head provides optimum operation. In this embodiment the deflector nozzle or head is positioned directly above the lift tube outlet in a cylindrical catalyst disengaging and surge chamber having an inside diameter of about 7½′ and a height of about 36′ with the lift tube end positioned about 15′ below the top of the vessel.

Certain modifications of the invention will become apparent to those skilled in the art and the illustrative details disclosed are not to be construed as imposing unnecessary limitations on the invention.

I claim:

1. A process for separating particulate solids from a lift gas at the upper end of a lift tube terminating within an enclosed separation zone which comprises directing jets of gas vertically downwardly and obliquely downwardly and outwardly relative to the axis of said tube from loci directly above the upper end of said tube a distance in the range of 0.75 to 2 tube diameters into the ascending solids so as to decrease the vertical kinetic energy and velocity of said solids whereby same are disentrained from said lift gas, leaving only fines in said lift gas; passing jetted and lift gas thru an expanded section of said zone above said loci so as to remove fines from said gas; withdrawing said solids from a lower section of said zone; and separately withdrawing gas from said zone at the upper end of said expanded section.

2. The process of claim 1 wherein said distance is about one tube diameter.

3. Apparatus for elevating particulate solids with a lift gas and disengaging said solids from the lift gas adjacent the end of a lift tube which comprises in combination an elongated upwardly extending lift tube having means at its lower end for injecting gas and entrained solids; a disengaging chamber surrounding the upper end of said tube, said tube extending a substantial distance into said chamber; a solids outlet in the lower section of said chamber; a gas jetting nozzle positioned directly above the end of said lift tube and having a plurality of jetting conduits therein directed downwardly and obliquely outwardly relatively to the axis of said tube and spaced from the end of said tube a distance within 0.75 to 2 tube diameters, said nozzle being adapted to direct jets of gas downwardly and obliquely across the upper end of said tube; an expanded upper section on said chamber above the level of said nozzle whereby jetted and lift gas carrying only entrained fines passes thru said upper section and is substantially denuded of said fines therein; and means for withdrawing gas from the top of said expanded section.

4. The apparatus of claim 3 wherein an axial jet in said nozzle is axially positioned with respect to said tube.

5. The apparatus of claim 4 wherein said nozzle has a restricted axial opening and oblique downwardly directed wall openings in close proximity to said axial opening.

6. The apparatus of claim 3 wherein said nozzle includes a multi-perforate plate on its face adjacent said tube.

7. The apparatus of claim 6 wherein said plate is concave and positioned obliquely with respect to the axis of said tube.

8. The apparatus of claim 6 wherein said plate is larger in area than the end of said tube and positioned transverse with respect to the axis thereof.

References Cited in the file of this patent

UNITED STATES PATENTS

| | | |
|---|---|---|
| 2,106,869 | Falkenstein | Feb. 1, 1938 |
| 2,672,374 | Norris | Mar. 16, 1954 |
| 2,684,270 | McClure | July 20, 1954 |
| 2,689,153 | McClure | Sept. 14, 1954 |
| 2,702,208 | Hill | Feb. 15, 1955 |
| 2,708,142 | Donovan | May 10, 1955 |
| 2,724,618 | Bearer | Nov. 22, 1955 |
| 2,752,203 | Thayer | June 26, 1956 |
| 2,753,221 | Thayer | July 3, 1956 |
| 2,767,031 | Huffman | Oct. 16, 1956 |